(12) United States Patent
Kodama et al.

(10) Patent No.: US 10,072,151 B2
(45) Date of Patent: Sep. 11, 2018

(54) ROOM-TEMPERATURE-CURABLE SILICONE RUBBER COMPOSITION, AND THE USE THEREOF

(71) Applicant: DOW CORNING TORAY CO., LTD., Tokyo (JP)

(72) Inventors: Harumi Kodama, Chiba (JP); Masayuki Onishi, Chiba (JP)

(73) Assignee: DOW CORNING TORAY CO., LTD., Tokyo (JP)

( * ) Notice: Subject to any disclaimer, the term of this patent is extended or adjusted under 35 U.S.C. 154(b) by 52 days.

(21) Appl. No.: 15/106,556

(22) PCT Filed: Dec. 25, 2014

(86) PCT No.: PCT/JP2014/006474
§ 371 (c)(1),
(2) Date: Jun. 20, 2016

(87) PCT Pub. No.: WO2015/098119
PCT Pub. Date: Jul. 2, 2015

(65) Prior Publication Data
US 2017/0029622 A1 Feb. 2, 2017

(30) Foreign Application Priority Data
Dec. 27, 2013 (JP) ................ 2013-272670

(51) Int. Cl.
C08L 83/04 (2006.01)
C09K 3/10 (2006.01)
C09J 183/04 (2006.01)
C08G 77/18 (2006.01)

(52) U.S. Cl.
CPC ............ *C08L 83/04* (2013.01); *C09J 183/04* (2013.01); *C09K 3/1018* (2013.01); *C08G 77/18* (2013.01); *C08L 2203/20* (2013.01); *C08L 2205/025* (2013.01); *C08L 2205/05* (2013.01)

(58) Field of Classification Search
None
See application file for complete search history.

(56) References Cited

U.S. PATENT DOCUMENTS

| | | | | |
|---|---|---|---|---|
| 4,652,624 A * | 3/1987 | Allen | ............... | C09K 3/1018 524/860 |
| 4,871,827 A * | 10/1989 | Klosowski | ........... | C08K 5/5415 528/15 |
| 4,888,404 A * | 12/1989 | Klosowski | ........... | C08K 5/5415 528/15 |
| 4,898,910 A * | 2/1990 | Kamis | ................. | C08L 83/14 524/425 |
| 5,340,899 A * | 8/1994 | Altes | ................... | C08G 77/50 524/731 |
| 5,948,854 A * | 9/1999 | de Buyl | ............... | C08K 5/057 523/209 |
| 6,008,284 A * | 12/1999 | Nylund | ............... | C08K 5/057 524/425 |
| 6,132,664 A * | 10/2000 | Freiberg | ............. | C08L 83/04 264/261 |
| 6,288,152 B1 * | 9/2001 | Okabe | ................ | C08L 83/04 524/102 |
| 8,957,153 B2 * | 2/2015 | Kodama | ............. | C08K 3/36 524/114 |
| 2006/0258817 A1 | 11/2006 | Kimura | | |
| 2008/0319121 A1 | 12/2008 | Mitani et al. | | |

FOREIGN PATENT DOCUMENTS

| | | | |
|---|---|---|---|
| EP | 0802222 A1 | 10/1997 | |
| EP | 1002837 A1 | 5/2000 | |
| EP | 1008613 A2 * | 6/2000 | ............ C08G 77/38 |
| EP | 1104787 A2 | 6/2001 | |
| JP | S55041702 A | 3/1980 | |
| JP | S62207383 A | 9/1987 | |
| JP | S62212488 A | 9/1987 | |
| JP | H02133490 A | 5/1990 | |
| JP | H07113083 A | 5/1995 | |
| JP | 2000169713 A | 6/2000 | |
| JP | 2001152020 A | 6/2001 | |
| JP | 2001192641 A | 7/2001 | |
| JP | 2003049072 A | 2/2003 | |
| JP | 2006022277 A | 1/2006 | |
| JP | 2006022278 A | 1/2006 | |
| JP | 2006316190 A | 11/2006 | |
| JP | 2006348119 A | 12/2006 | |
| JP | 2007231172 A | 9/2007 | |
| JP | 2012219113 A | 11/2012 | |
| JP | 2013221135 A | 10/2013 | |
| KR | 101166034 A | 7/2012 | |
| WO | WO 2012137854 A1 * | 10/2012 | ............ C08L 83/14 |
| WO | WO2012137854 A1 | 10/2012 | |

OTHER PUBLICATIONS

PCT/JP2014/006474 International Search Report dated Apr. 7, 2015, 4 pages.
English language abstract and machine translation for JPS55041702 (A) extracted from https://4.j-platpat.inpit.go.jp database dated Jun. 16, 2016, 5 pages.
English language abstract and machine translation for JPS62207383 (A) extracted from http://worldwide.espacenet.com database dated Jun. 16, 2016, 13 pages.
English language abstract and machine translation for JPS62212488 (A) extracted from http://worldwide.espacenet.com database dated Jun. 16, 2016, 13 pages.

(Continued)

*Primary Examiner* — Robert S Loewe
(74) *Attorney, Agent, or Firm* — Warner Norcross & Judd LLP

(57) ABSTRACT

A room-temperature-curable silicone rubber composition exhibiting good adhesion to a substrate contacted during curing and capable of suppressing the occurrence of oil bleeding is disclosed. The room-temperature-curable silicone rubber composition comprises: (A) a mixture of (A1) an organopolysiloxane having at least two specified alkoxysilyl-containing groups in the molecular and (A2) an organopolysiloxane having one specified alkoxysilyl-containing group in the molecular; (B) an organopolysiloxane lacking a hydroxyl group and an alkoxy group; (C) an alkoxysilane; and (D) a condensation-reaction catalyst.

13 Claims, No Drawings

(56) References Cited

OTHER PUBLICATIONS

English language abstract and machine translation for JPH02133490 (A) extracted from http://worldwide.espacenet.com database dated Jun. 16, 2016, 10 pages.

English language abstract and machine translation for JPH07113083 (A) extracted from http://worldwide.espacenet.com database dated Jun. 16, 2016, 21 pages.

English language abstract and machine translation for JP2000169713 (A) extracted from http://worldwide.espacenet.com database dated Jun. 16, 2016, 21 pages.

English language abstract and machine translation for JP2003049072 (A) extracted from https://4.j-platpat.inpit.go.jp database dated Jun. 16, 2016, 27 pages.

English language abstract and machine translation for JP2006022277 (A) extracted from https://4.j-platpat.inpit.go.jp database dated Jun. 16, 2016, 23 pages.

English language abstract and machine translation for JP2006022278 (A) extracted from https://4.j-platpat.inpit.go.jp database dated Jun. 16, 2016, 19 pages.

English language abstract and machine translation for JP2006348119 (A) extracted from http://worldwide.espacenet.com database dated Jun. 16, 2016, 17 pages.

English language abstract and machine translation for JP2007231172 (A) extracted from http://worldwide.espacenet.com database dated Jun. 16, 2016, 17 pages.

English language abstract and machine translation for JP2012219113 (A) extracted from http://worldwide.espacenet.com database dated Jun. 16, 2016, 16 pages.

English language abstract and machine translation for JP2013221135 (A) extracted from https://4.j-platpat.inpit.go.jp database dated Jun. 16, 2016, 37pages.

English language abstract and machine translation for JP2001192641 (A) extracted from http://worldwide.espacenet.com database dated Apr. 9, 2018, 14 pages.

\* cited by examiner

ROOM-TEMPERATURE-CURABLE SILICONE RUBBER COMPOSITION, AND THE USE THEREOF

CROSS-REFERENCE TO RELATED APPLICATIONS

This application is the National Stage of International Application No. PCT/JP2014/006474 filed on 25 Dec. 2014, which claims priority to and all advantages of Japanese Patent Application No. 2013-272670 filed on 27 Dec. 2013, the content of which is hereby incorporated by reference.

TECHNICAL FIELD

The present invention relates to a room-temperature-curable silicone rubber composition that cures at room temperature by contact with moisture in air, a silicone rubber cured product obtained by curing the room-temperature-curable silicone rubber composition, and an electronic device possessing the silicone rubber cured product. Priority is claimed on Japanese Patent Application No. 2013-272670, filed on Dec. 27, 2013, the content of which is incorporated herein by reference.

BACKGROUND ART

Room-temperature-curable silicone rubber compositions consisting of an organopolysiloxane having at least two alkoxysilyl-containing groups in each molecule, an alkoxysilane, and an organic titanium compound cure at room temperature by contact with moisture in air (refer to Patent Documents 1 to 4). Such room-temperature-curable silicone rubber compositions are used in applications such as sealants, adhesives, and moisture-proof coating agents in electrical circuits or electrodes by being cured in contact with such electrical circuits or electrodes.

However, the room-temperature-curable silicone rubber compositions described in Patent Documents 1 to 4 have the problem that adhesion to substrates is insufficient.

CITATION LIST

Patent Literature

Patent Document 1: Japanese Unexamined Patent Application Publication No. 2006-22277A
Patent Document 2: Japanese Unexamined Patent Application Publication No. 2006-22278A
Patent Document 3: Japanese Unexamined Patent Application Publication No. 2007-231172A
Patent Document 4: Japanese Unexamined Patent Application Publication No. 2012-219113A

SUMMARY OF INVENTION

Technical Problem

An object of the present invention is to provide a room-temperature-curable silicone rubber composition which, by curing at room temperature by contacting moisture in air, forms a silicone rubber cured product exhibiting good adhesion to a substrate contacted during curing and capable of suppressing the occurrence of oil bleeding.

Solution to Problem

As a result of diligent research to solve the above problem, the present inventors discovered that the above problem can be solved by a room-temperature-curable silicone rubber composition containing (A) a mixture of (A1) an organopolysiloxane having in each molecule at least two specified alkoxysilyl-containing groups on silicon atoms in the molecular chain and (A2) an organopolysiloxane having in each molecule one specified alkoxysilyl-containing group on a silicon atom in the molecular chain; (B) an organopolysiloxane lacking a hydroxyl group and an alkoxy group on a silicon atom in the molecular chain; (C) an alkoxysilane or partially hydrolyzed condensate thereof; and (D) a condensation-reaction catalyst, and they thereby achieved the present invention.

Specifically, the room-temperature-curable silicone rubber composition of the present invention comprises:

(A) a mixture containing the following components (A1) and (A2):

(A1) an organopolysiloxane having in each molecule at least two alkoxysilyl-containing groups represented by the general formula:

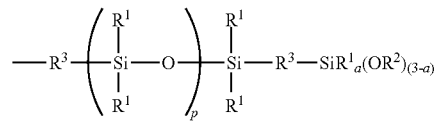

(wherein $R^1$ is the same or different monovalent hydrocarbon group lacking an aliphatic unsaturated bond, $R^2$ is an alkyl group, $R^3$ is the same or different alkylene group, a is an integer from 0 to 2, and p is an integer from 1 to 50) on silicon atoms in the molecular chain;

(A2) an organopolysiloxane having in each molecule one of the above alkoxysilyl-containing groups;

(B) an organopolysiloxane lacking a hydroxyl group and an alkoxy group on a silicon atom in the molecular chain;

(C) an alkoxysilane represented by the general formula:

(wherein $R^4$ is a monovalent hydrocarbon group, $R^5$ is an alkyl group, and b is from 0 to 2)

or a partially hydrolyzed condensate thereof; and (D) a condensation-reaction catalyst.

More advantageously, the mass ratio of component (A1) and component (A2) in component (A) is from 1:9 to 9:1.

More advantageously, the viscosity at 25 C of component (A) as a whole is in a range from 100 to 1,000,000 mPa s.

Component (A1) is preferably a straight-chain organopolysiloxane having an alkoxysilyl-containing group on a silicon atom at both molecular terminals, and component (A2) is preferably a straight-chain organopolysiloxane having an alkoxysilyl-containing group on a silicon atom at one molecular terminal.

The alkoxysilyl-containing group in component (A) is preferably a group represented by the formula:

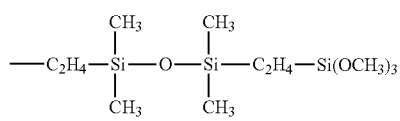

Preferably, the viscosity at 25 C of component (B) is in a range from 10 to 1,000,000 mPa s.

Preferably, component (C) is methyltrimethoxysilane.

The room-temperature-curable silicone rubber composition of the present invention preferably contains from 1 to 100 parts by mass of component (B), contains from 0.5 to 30 parts by mass of component (C), and contains from 0.1 to 10 parts by mass of component (D), relative to 100 parts by mass of component (A).

The room-temperature-curable silicone rubber composition of the present invention preferably further comprises (E) an adhesion promoter.

Preferably, component (E) is selected from the group consisting of epoxy group-containing alkoxysilanes, acrylic group-containing alkoxysilanes, amino group-containing alkoxysilanes, and reaction mixtures of epoxy group-containing alkoxysilanes and amino group-containing alkoxysilanes.

The room-temperature-curable silicone rubber composition of the present invention preferably further comprises (F) a reinforcing filler.

Preferably, component (F) is selected from the group consisting of fumed silica fine powder, precipitated silica fine powder, baked silica fine powder, and fumed titanium oxide fine powder.

The present invention further relates to a silicone rubber cured product which is obtained by curing the above room-temperature-curable silicone rubber composition of the present invention.

The present invention also relates to an electronic device provided with the above silicone rubber cured product.

Advantageous Effects of Invention

The room-temperature-curable silicone rubber composition according to the present invention, by curing at room temperature by contacting moisture in air, can form a silicone rubber cured product exhibiting good adhesion to a substrate contacted during curing, and capable of suppressing the occurrence of oil bleeding (seepage of oil components).

The silicone rubber cured product according to the present invention also exhibits good adhesion to a substrate and is capable of suppressing the occurrence of oil bleeding. Furthermore, the electronic device according to the present invention has good reliability due to the fact that the above silicone rubber cured product exhibits good adhesion to a substrate and suppresses the occurrence of oil bleeding.

DESCRIPTION OF EMBODIMENTS

Room-Temperature-Curable Silicone Rubber Composition

The room-temperature-curable silicone rubber composition according to the present invention comprises the above components (A) to (D). Such a room-temperature-curable silicone rubber composition, by curing at room temperature by contacting moisture in air, can form a silicone rubber cured product exhibiting good adhesion to a substrate contacted during curing and capable of suppressing the occurrence of oil bleeding. Each of the components will be described in detail below. Note that in the present specification, viscosity is the value measured using a type-B viscometer according to JIS K 7117-1 at 25 C.

Component (A) is the base compound of the present composition, and is a mixture of (A1) an organopolysiloxane having in each molecule at least two alkoxysilyl-containing groups represented by the following formula on silicon atoms in the molecular chain and (A2) an organopolysiloxane having in each molecule one alkoxysilyl-containing group represented by the following formula on a silicon atom in the molecular chain.

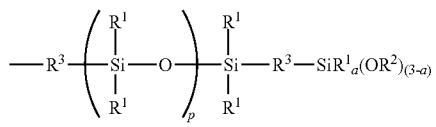

In the formula, $R^1$ is the same or different monovalent hydrocarbon group lacking an aliphatic unsaturated bond, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, or aryl group is preferred, and a methyl group or phenyl group is more preferred. In the formula, $R^2$ is an alkyl group, examples of which include a methyl group, ethyl group, propyl group, butyl group, pentyl group, hexyl group, heptyl group, octyl group, nonyl group, decyl group, and octadecyl group. A methyl group or ethyl group is preferred. In the formula $R^3$ is the same or different alkylene group, examples of which include a methylmethylene group, ethylene group, methylethylene group, propylene group, butylene group, pentylene group, hexylene group, heptylene group, and octylene group. A methylmethylene group, ethylene group, methylethylene group, or propylene group is preferred. In the formula, a is an integer from 0 to 2, and preferably 0 or 1. In the formula, p is an integer from 1 to 50, preferably an integer from 1 to 20, more preferably an integer from 1 to 10, and particularly preferably an integer from 1 to 5.

Examples of such alkoxysilyl-containing groups include groups represented by the formula:

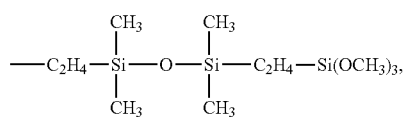

groups represented by the formula:

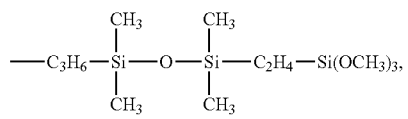

groups represented by the formula:

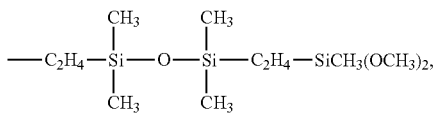

groups represented by the formula:

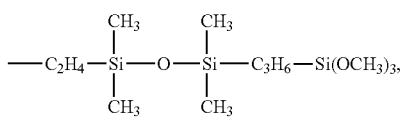

groups represented by the formula:

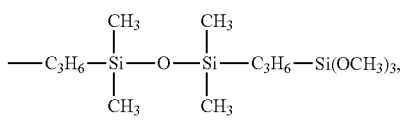

groups represented by the formula:

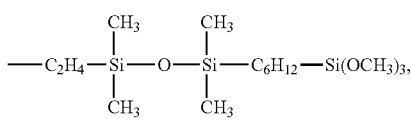

groups represented by the formula:

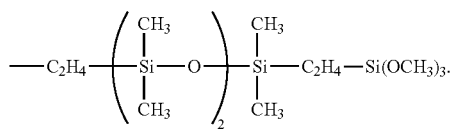

Examples of groups other than the alkoxysilyl-containing groups bonded to silicon atoms in the molecular chain of component (A1) and component (A2) include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl group, pentenyl group, hexenyl group, and heptenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, alkenyl group, or aryl group is preferred, and a methyl group, vinyl group, or phenyl group is more preferred.

The molecular structures of component (A1) and component (A2) are not limited and, for example, may have a straight, partially branched straight, branched or cyclic molecular structure, among which straight, partially branched straight or branched molecular structures are preferred. The alkoxysilyl-containing groups may be bonded to silicon atoms at the molecular chain terminals, or to silicon atoms along the molecular chain. As component (A1), an organopolysiloxane having a straight-chain molecular structure and having the alkoxysilyl-containing groups mentioned above on a silicon atom at both terminals of the molecular chain is preferred. As component (A2), an organopolysiloxane having a straight-chain molecular structure and having the alkoxysilyl-containing groups mentioned above on a silicon atom at one terminal of the molecular chain is preferred.

The viscosity at 25 C of component (A) as a whole is not limited, but is preferably in a range from 100 to 1,000,000 mPa s, and more preferably in a range from 100 to 100,000 mPa s. When the viscosity of component (A) is not less than the minimum value of the range given above, the mechanical strength of the resulting silicone rubber cured product is improved, and when it is not greater than the maximum value of the range given above, the handling and processability of the resulting composition are improved.

The mass ratio of component (A1) and component (A2) in component (A) is preferably from 1:10 to 10:1, more preferably from 1:9 to 9:1, even more preferably from 1:7 to 7:1, and particularly preferably from 1:5 to 5:1. By the mass ratio of component (A1) and component (A2) being in this range, the silicone rubber cured product obtained from the present composition can have an appropriate degree of softness, and as a result, the adhesion of this silicone rubber cured product can be improved and the occurrence of oil bleeding can be suppressed.

Examples of the method for producing component (A1) or component (A2) include the methods described in Japanese Unexamined Patent Application Publication Nos. S62-207383A and S62-212488A.

Component (B) is a component for making the silicone rubber cured product obtained from the present composition suitably soft, and for improving adhesion. It is an organopolysiloxane lacking a hydroxyl group and an alkoxy group on a silicon atom in the molecular chain. Examples of groups other than hydroxyl groups and alkoxy groups bonded to a silicon atom in component (B) include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl group, pentenyl group, hexenyl group, and heptenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, alkenyl group, or aryl group is preferred, and a methyl group, vinyl group, or phenyl group is more preferred. Examples of component (B) include dimethylpolysiloxane capped at both molecular terminals with dimethylvinylsiloxy groups and dimethylpolysiloxane capped at both ends with trimethylsiloxy groups, and the like. The molecular structure of component (B) is not limited and, for example, may have a straight, partially branched straight, branched or cyclic molecular structure, among which straight, partially branched straight or branched molecular structures are preferable. The viscosity at 25 C of component (B) is not limited, but is preferably in a range from 10 to 1,000,000 mPa s, and more preferably in a range from 50 to 100,000 mPa s. When the viscosity of component (B) is not less than the minimum value of the range given above, bleed-out of component (B) from the resulting silicone rubber cured product can be controlled, and when it is not greater than the maximum value of the range given above, the handling and processability of the resulting composition are improved.

There is no limitation on the content of component (B), but, for example, it is in the range of 1 to 100 parts by mass relative to 100 parts by mass of component (A), preferably in the range of 1 to 80 parts by mass, more preferably in the range of 1 to 70 parts by mass, and particularly preferably in the range of 1 to 60 parts by mass. When the content of component (B) is greater than or equal to the minimum value of the range given above, the adhesion of the resulting composition is good, and when it is less than or equal to the maximum value of the range given above, bleed-out of component (B) from the resulting silicone rubber cured product can be controlled. In particular, the content of component (B) is preferably in a range from 15 to 60 parts by mass relative to 100 parts by mass of component (A) because adhesion to organic resin is good.

Component (C) is a component that acts as a crosslinking agent of the present composition, and is an alkoxysilane represented by the general formula:

$$R^4{}_b Si(OR^5)_{(4-b)}$$

(wherein $R^4$ is a monovalent hydrocarbon group, $R^5$ is an alkyl group, and b is from 0 to 2)

or a partially hydrolyzed condensate thereof.

In the formula, $R^4$ is the same or different monovalent hydrocarbon group, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl group, pentenyl group, hexenyl group, and heptenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, alkenyl group, or aryl group is preferred, and a methyl group is more preferred. Furthermore, in the formula, $R^5$ is the same or different alkyl group, examples of which include a methyl group, ethyl group, propyl group, butyl group, pentyl group, and hexyl group. A methyl group is preferred.

Examples of component (C) include bifunctional alkoxysilanes such as dimethyldimethoxysilane, methylphenyldimethoxysilane, and diphenyldimethoxysilane; trifunctional alkoxysilanes such as methyltrimethoxysilane, methyltriethoxysilane, ethyltrimethoxysilane, ethyltriethoxysilane, vinyltrimethoxysilane, and phenyltrimethoxysilane; tetrafunctional alkoxysilanes such as tetramethoxysilane and tetraethoxysilane; and partially hydrolyzed condensates thereof. Component (C) may be one of these alkoxysilanes or partially hydrolyzed condensates thereof used alone or a combination of two or more used as a mixture.

There is no limitation on the content of component (C), but, for example, it is in the range of 0.5 to 30 parts by mass relative to 100 parts by mass of component (A), preferably in the range of 0.5 to 20 parts by mass, more preferably in the range of 0.5 to 15 parts by mass, and particularly preferably in the range of 0.5 to 10 parts by mass. When the content of component (C) is not less than the minimum value of the range given above, the curability of the resulting composition is sufficient and the shelf life of the resulting composition under moisture blocking is improved, and when it is not greater than the maximum value of the range given above, the resulting composition cures rapidly by moisture in air.

Component (D) is a condensation-reaction catalyst that promotes crosslinking of the present composition. Examples of this component (D) include tin compounds such as dimethyltin dineodecanoate and stannous octoate, titanium compounds such as tetra(isopropoxy)titanium, tetra(n-butoxy)titanium, tetra(t-butoxy)titanium, di(isopropoxy)bis(ethylacetoacetate)titanium, di(isopropoxy)bis(methylacetoacetate)titanium, and di(isopropoxy)bis(acetylacetonate) titanium, and the like.

There is no limitation on the content of component (D), but it is in the range of 0.1 to 10 parts by mass relative to 100 parts by mass of component (A), preferably in the range of 0.1 to 6 parts by mass. When the content of component (D) is not less than the minimum value of the range given above, the resulting composition cures rapidly by moisture in air, and when it is not greater than the maximum value of the range given above, the shelf life of the resulting composition is improved.

The room-temperature-curable silicone rubber composition according to the present invention may also contain components other than components (A) to (D); for example, it may further contain components (E) and (F) below.

Component (E) is an adhesion promoter, for improving adhesion to organic resins contacted during curing of the present composition. Examples of the adhesion promoter of component (E) include epoxy group-containing alkoxysilanes such as 3-glycidoxytrimethoxysilane, 3-glycidoxypropyltriethoxysilane, 3-glycidoxypropylmethoxysilane, 2-(3,4-epoxycyclohexyl)ethyltrimethoxysilane, and 4-oxysilanylbutyltrimethoxysilane; acrylic group-containing alkoxysilanes such as 3-methacryloxypropyltrimethoxysilane, 3-methacryloxypropyltriethoxysilane, and 3-acryloxypropyltrimethoxysilane; amino group-containing alkoxysilanes such as 3-aminopropyltrimethoxysilane, 3-aminopropyltriethoxysilane, N-(2-aminoethyl)-3-aminopropyltrimethoxysilane, and N-phenyl-3-aminopropyltrimethoxysilane; and reaction mixtures of the above epoxy group-containing alkoxysilanes and the above amino group-containing alkoxysilanes, such as carbasilatrane. Reaction mixtures of the above epoxy group-containing alkoxysilanes and the above amino group-containing alkoxysilanes are preferred. Examples of methods for preparing such reaction mixtures of the above epoxy group-containing alkoxysilanes and the above amino group-containing alkoxysilanes include the methods described in Japanese Examined Patent Application Publication Nos. S55-41702A and H07-113083A.

The content of component (E) is not limited provided that it is an amount that can impart sufficient adhesion to the organic resin that the present composition contacts during curing, but it is preferably in the range of 0.01 to 10 parts by mass relative to 100 parts by mass of component (A), and more preferably in the range of 0.01 to 5 parts by mass. When the content of component (E) is not less than the minimum value of the range given above, the adhesion to organic resin is sufficient, and when it is not greater than the maximum value of the range given above, the resulting composition cures rapidly by moisture in air.

Component (F) is a reinforcing filler for imparting mechanical strength to the silicone rubber cured product obtained by curing the present composition, and improving releasability from the substrate. Examples of component (F) include fumed silica fine powder, precipitated silica fine powder, fused silica fine powder, baked silica fine powder, fumed titanium dioxide fine powder, glass fiber and hydrophobized fine powders obtained by surface treating these fine powders with organosilanes, silazanes, or siloxane oligomers. Although no particular limitation is placed on the particle diameter of the fine powder of component (F), it may be, for example, in the range of 0.01 micro meters to 1000 micro meters by median diameter according to measurement using laser diffraction/scattering type particle size distribution.

The content of component (F) is not limited, but is preferably from 0.1 to 50 parts by mass relative to 100 parts by mass of component (A).

Additionally, the present composition may also contain other optional components, provided that the object of the present invention is not hindered, examples of which include non-reinforcing fillers such as quart fine powder, calcium carbonate fine powder, diatomaceous earth fine powder, aluminum hydroxide fine powder, alumina fine powder, magnesium hydroxide fine powder, magnesia fine powder, zinc oxide fine powder, zinc carbonate fine powder, and hydrophobized fine powders obtained by surface treating these fine powders with organosilanes, silazanes, and siloxane oligomers; organic solvents; antifungal agents; flame retardants; heat-resisting agents; plasticizers; thixotropy imparting agents; curing promoters; corrosion/migration inhibitor for wiring or electrode, and/or pigments such as carbon black.

The present invention may be produced by uniformly mixing components (A) to (D), and, as necessary, components (E) and (F) and other optional components under moisture blocking. The method for mixing the components of the silicone composition may be a conventional known method and is not particularly limited, but is normally uniform mixing by simple stirring. Furthermore, when solid components such as inorganic fillers or the like are contained as optional components, mixing using a mixing device is more preferable. Such a mixing device is not particularly limited, but is exemplified by a single-screw or twin-screw continuous mixer, twin roller, Ross mixer, Hobart mixer, dental mixer, planetary mixer, kneader mixer, Henschel mixer, and the like. The present mixture prepared in this manner can be stored for a long period by sealing in an air-tight container under moisture blocking.

<Silicone Rubber Cured Product>

The silicone rubber cured product according to the present invention is obtained by curing the room-temperature-curable silicone rubber composition described above. The method for curing the room-temperature-curable silicone rubber composition is not particularly limited, but normally, the composition can be rapidly cured by contacting moisture in air to form a silicone rubber cured product. Such a silicone rubber cured product exhibits good adhesion to a substrate contacted during curing and suppresses the occurrence of oil bleeding.

The silicone rubber cured product can exhibit good adhesion to various substrates. Examples of such substrates include various substrates such as glass, ceramic, mortar, concrete, wood, plastic, and metal. Examples of plastic substrates include thermosetting resins such as epoxy resin, phenol resin, urea resin, melamine resin, and silicon resin, and thermoplastic resins such as polycarbonate resin, polyester resin, ABS resin, nylon resin, polyvinyl chloride resin, acrylonitrile resin, polybutylene terephthalate resin, polyphenylene sulfide resin, polyphenylene resin, and polyethylene terephthalate resin. Examples of metal substrates include metals such as copper, stainless steel, iron, zinc plate, tin plate, brass, zinc, and nickel.

<Electronic Device>

An electronic device according to the present invention is provided with the silicone rubber cured product described above. The electronic device is not particularly limited, but is exemplified by electronic devices that contain electrical circuits or electrodes in which metal oxide film electrodes such as indium tin oxide (ITO) are formed, and metal electrodes of silver, copper, aluminum, gold or the like on a substrate such as glass, epoxy resin, polyimide resin, phenolic resin, ceramic or the like. Examples of such electrodes include electrodes of liquid crystal displays (LCDs), flat panel displays (FPDs), and flat panel display devices. The present composition may be used for coating of such electrodes. The electronic device according to the present invention is useful in the affixing of parts because the silicone rubber cured product exhibits high adhesion to substrates, and has good reliability because it can suppress the occurrence of oil bleeding.

EXAMPLES

The room-temperature-curable silicone rubber composition of the present invention will now be described using practical examples. Note that in the practical examples, viscosity is the value measured using a type-B viscometer according to JIS K 7117-1 at 25 C. Additionally, adhesion to substrates and occurrence of oil bleeding of the silicone rubber cured product obtained by curing the room-temperature-curable silicone rubber composition were evaluated as follows.

<Method for Evaluating Adhesion of Silicone Rubber Cured Product to Substrate>

An adhesive layer consisting of a room-temperature-curable silicone rubber composition was formed at a thickness of 1 mm on various substrates, and this was left standing for 7 days at 25 C, 50% RH to cure the composition, thereby producing a sample. The sample was cut into strips (length 4.0 cm×width 1.0 cm×thickness 0.5 mm), and a peel test was performed at a speed of 50 mm/minute in the 180 degree direction. The condition of the adhesive broken face was observed macroscopically, and the proportion of silicone rubber cured product that incurred cohesive failure was determined as the cohesive failure (CF) rate. A high CF rate signifies that the silicone rubber cured product has good adhesion to the substrate. Substrates made of glass (GL) and Nylon 66 (NY66) were used as the substrates.

<Evaluation of Oil Bleeding of Silicone Rubber Cured Product>

0.2 g of room-temperature-curable silicone rubber composition was dripped onto a ground glass plate, and this was left standing at 25 C, 50% RH for 7 days, and the presence or absence of oil components that bled (seeped out) after the room-temperature-curable silicone rubber composition was cured was checked macroscopically.

The following raw materials were used to prepare room-temperature-curable silicone rubber compositions of practical examples and comparative examples.

Component (A1): Straight-chain dimethylpolysiloxane having viscosity of 500 mPas, and having a trimethoxysilylethyl-containing group represented by the following formula:

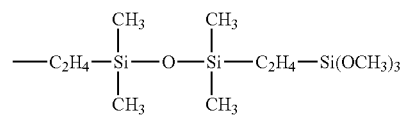

on silicon atoms at both molecular terminals

Component (A2): Straight-chain dimethylpolysiloxane having viscosity of 500 mPa s, and having a trimethoxysilylethyl-containing group represented by the formula:

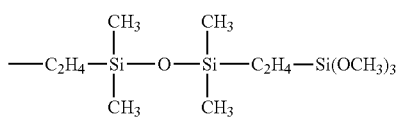

on a silicon atom at one molecular terminal

Component (B-1): Straight-chain dimethylpolysiloxane having a dimethylvinylsiloxy group on silicon atoms at both molecular terminals, having viscosity of 400 mPa s Component (B-2): Straight-chain dimethylpolysiloxane having a trimethylsiloxy group on silicon atoms at both molecular terminals, having viscosity of 500 mPa s Component (C): Methyltrimethoxysilane Component (D): Di(isopropoxy)bis(ethylacetoacetate)titanium Component (E): Carbasilatrane (reaction mixture of epoxy silane and amino silane)

Component (F): Fumed silica fine powder surface-treated with hexamethyldisilazane, having a specific surface area by BET of 130 m$^2$/g Note that component (A1) and component (A2) above were prepared according to the method described in Japanese Unexamined Patent Application Publication No. S62-207383A.

Practical Examples 1 to 8 and Comparative Examples 1 to 4

Room-temperature-curable silicone rubber compositions were prepared by uniformly mixing component (A1), component (A2), component (B-1) component (B-2), component (C), component (D), component (E), and component (F) in the blending amounts shown in Table 1 under moisture blocking. The adhesion and occurrence of oil bleeding of the silicone rubber cured products obtained by curing these room-temperature-curable silicone rubber compositions were evaluated. Those results are shown in Table 1.

cured product exhibiting good adhesion to a substrate contacted during curing and capable of suppressing the occurrence of oil bleeding. Therefore, it is advantageous in affixing electrical and electronic parts, and is advantageous as a sealant, adhesive, or moisture-proof coating agent that brings about high reliability.

The invention claimed is:

1. A room-temperature-curable silicone rubber composition comprising: (A) 100 parts by mass of a mixture containing components (A1) and (A2) in a mass ratio of from 1:10 to 10:1 below:
   (A1) a straight-chain dimethylpolysiloxane having at each molecular terminal a silicon-bonded alkoxysilyl-containing group having the structure:

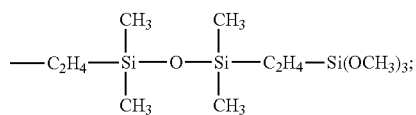

(A2) a straight-chain dimethylpolysiloxane having at only one molecular terminal a silicon-bonded alkoxysilyl-containing group having the structure:

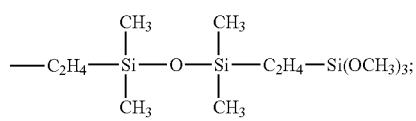

(B) 1 to 100 parts by mass of a straight chain dimethylpolysiloxane having a dimethylvinylsiloxy group bonded to silicon at both molecular terminals and lacking a hydroxyl group and an alkoxy group on a silicon atom in the molecular chain;

TABLE 1

| | Practical examples | | | | | | | | Comparative examples | | | |
|---|---|---|---|---|---|---|---|---|---|---|---|---|
| | 1 | 2 | 3 | 4 | 5 | 6 | 7 | 8 | 1 | 2 | 3 | 4 |
| Component (A1) | 36.0 | 49.0 | 64.0 | 81.0 | 38.0 | 49.0 | 64.0 | 81.0 | 100 | 91.0 | 83.0 | 71.9 |
| Component (A2) | 48.0 | 42.0 | 32.0 | 18.0 | 48.0 | 42.0 | 32.0 | 18.0 | — | — | — | — |
| Component (8-1) | 16.0 | 8.0 | 4.0 | 1.0 | 18.0 | 8.0 | 4.0 | 1.0 | — | — | — | — |
| Component (8-2) | — | — | — | — | — | — | — | — | — | 9.0 | 17.0 | 29.0 |
| Component (C) | 3.00 | 2.00 | 2.00 | 2.00 | 2.00 | 2.00 | 3.00 | 3.00 | 2.00 | 2.00 | 2.00 | 2.00 |
| Component (D) | 2.00 | 2.00 | 2.00 | 2.00 | 2.00 | 2.00 | 2.00 | 2.00 | 2.00 | 2.00 | 2.00 | 2.00 |
| Component (E) | — | — | — | — | 0.30 | 0.30 | 0.30 | 0.30 | — | — | — | — |
| Component (F) | — | — | — | — | 5.0 | 5.0 | 5.0 | 5.0 | — | — | — | — |
| Adhesion (cohesive failure (CF) rate (%) to various substrates) GL | 100 | 100 | 100 | 100 | 100 | 100 | 100 | 100 | 0 | 100 | 100 | 100 |
| NY 86 | 100 | 100 | 100 | 100 | 100 | 100 | 100 | 100 | 0 | 0 | 0 | 0 |
| Occurrence of oil bleeding | No | No | No | No | No | No | No | No | No | No | Yes | Yes |

INDUSTRIAL APPLICABILITY

The room-temperature-curable silicone rubber composition of the present invention cures at room temperature by contact with moisture in air, and forms a silicone rubber (C) 0.5 to 30 parts by mass of methyltrimethoxysilane;

(D) a condensation-reaction catalyst;

(E) an adhesion promoter; and (F) a reinforcing filler.

2. The room-temperature-curable silicone rubber composition according to claim 1, wherein a viscosity at 25° C. of the component (A) as a whole is in a range of 100 to 1,000,000 mPa·s.

3. The room-temperature-curable silicone rubber composition according to claim 1, wherein a viscosity at 25° C. of the component (B) is in a range of 10 to 1,000,000 mPas.

4. The room-temperature-curable silicone rubber composition according to claim 1, wherein component (E) is selected from the group consisting of: epoxy group-containing alkoxysilanes, acrylic group-containing alkoxysilanes, amino group-containing alkoxysilanes, and reaction mixtures of epoxy group-containing alkoxysilanes and amino group-containing alkoxysilanes.

5. The room-temperature-curable silicone rubber composition according to claim 1, wherein component (F) is selected from the group consisting of: fumed silica fine powder, precipitated silica fine powder, baked silica fine powder, and fumed titanium oxide fine powder.

6. A silicone rubber cured product which is obtained by curing the room-temperature-curable silicone rubber composition described in claim 1.

7. An electronic device provided with the silicone rubber cured product described in claim 6.

8. The room-temperature-curable silicone rubber composition according to claim 1, wherein components (A1) and (A2) each have a viscosity at 25° C. of 500 mPas, and wherein component (B) has a viscosity at 25° C. of 400 mPas.

9. The room-temperature-curable silicone rubber composition according to claim 8, further comprising (B2) a straight-chain dimethylpolysiloxane having a trimethylsiloxy group bonded to silicon at each molecular terminal.

10. The room-temperature-curable silicone rubber composition according to claim 9, wherein the component (B2) has a viscosity at 25° C. of 500 mPa·s.

11. The room-temperature-curable silicone rubber composition according to claim 1, further comprising (B2) a straight-chain dimethylpolysiloxane having a trimethylsiloxy group bonded to silicon at each molecular terminal.

12. The room-temperature-curable silicone rubber composition according to claim 11, wherein the component (B2) has a viscosity at 25° C. of 500 mPa·s.

13. A room-temperature-curable silicone rubber composition comprising: (A) a mixture containing components (A1) and (A2) below:
(A1) a straight-chain dimethylpolysiloxane having a viscosity at 25° C. of 500 mPa·s and having at each molecular terminal a silicon-bonded alkoxysilyl-containing groups represented by general formula:

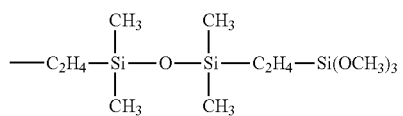

(A2) a straight-chain dimethylpolysiloxane having a viscosity at 25° C. of 500 mPa·s and at one molecular terminal one of the above alkoxysilyl-containing groups;
(B) a straight chain dimethylpolysiloxane having a viscosity at 25° C. of 400 mPa·s, a dimethylvinylsiloxy group bonded to silicon at both molecular terminals and lacking a hydroxyl group and an alkoxy group on a silicon atom in the molecular chain;
(B2) a straight-chain dimethylpolysiloxane having a viscosity at 25° C. of 500 mPa·s and a trimethylsiloxy group bonded to silicon at each molecular terminal
(C) methyltrimethoxysilane;
(D) a condensation-reaction catalyst;
(E) carbasilatrane; and
(F) fumed silica.

* * * * *